United States Patent
Morimoto et al.

(10) Patent No.: US 6,581,707 B2
(45) Date of Patent: Jun. 24, 2003

(54) CONTROL APPARATUS FOR HYBRID VEHICLE

(75) Inventors: Kazuhiko Morimoto, Shizuoka-ken (JP); Yoshiaki Omata, Shizuoka-ken (JP); Kazuyoshi Noda, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 52 days.

(21) Appl. No.: 09/825,398

(22) Filed: Apr. 3, 2001

(65) Prior Publication Data

US 2002/0020571 A1 Feb. 21, 2002

(30) Foreign Application Priority Data

Apr. 4, 2000 (JP) .......................................... 2000-101969

(51) Int. Cl.⁷ ................................................. B60Q 1/00
(52) U.S. Cl. ..................... 180/65.3; 180/65.2; 340/456; 340/441
(58) Field of Search ................................ 180/65.3, 65.2, 180/65.4; 340/439, 453, 425.5, 438, 428, 441, 455, 456, 457

(56) References Cited

U.S. PATENT DOCUMENTS

| | | | | |
|---|---|---|---|---|
| 4,701,852 A | * | 10/1987 | Ulveland | 340/439 |
| 4,719,820 A | * | 1/1988 | Hibino et al. | 340/456 |
| 4,853,673 A | * | 8/1989 | Kido et al. | 340/439 |
| 4,868,756 A | * | 9/1989 | Kawanabe et al. | 340/439 |
| 5,017,916 A | * | 5/1991 | Londt et al. | 340/439 |
| 5,477,452 A | * | 12/1995 | Milunas et al. | 340/439 |
| 5,941,922 A | * | 8/1999 | Price et al. | 340/439 |
| 5,982,280 A | * | 11/1999 | Fahrbach et al. | 340/453 |
| 6,018,199 A | | 1/2000 | Shiroyama et al. | 290/37 A |
| 6,027,426 A | * | 2/2000 | Holman | 200/61.88 |
| 6,166,631 A | * | 12/2000 | Kennedy et al. | 340/439 |
| 6,329,772 B1 | | 12/2001 | Ochiai et al. | 318/139 |
| 6,362,580 B1 | | 3/2002 | Omata et al. | 318/139 |
| 6,373,206 B1 | | 4/2002 | Morimoto et al. | 318/139 |
| 6,404,332 B1 | * | 6/2002 | Wakashiro et al. | 180/338 |
| 6,443,126 B1 | | 9/2002 | Morimoto et al. | 123/339.15 |

FOREIGN PATENT DOCUMENTS

| | | | | |
|---|---|---|---|---|
| JP | 7-315078 | 12/1995 | | |
| JP | 1068976 A2 | * 1/2001 | | B60K/6/02 |

* cited by examiner

Primary Examiner—Brian L. Johnson
Assistant Examiner—J. Allen Shriver
(74) Attorney, Agent, or Firm—Flynn, Thiel, Boutell & Tanis, P.C.

(57) ABSTRACT

A hybrid vehicle includes an engine controller which controls a running state of the engine, a motor controller which controls both driving and battery recharging power-generating states, and an indicator which is connected to the motor controller. The indicator is turned on when the recharging power generating control is executed during slowdown of the hybrid vehicle. The indicator is turned on and off when the recharging power generating control is not executed during slowdown of the hybrid vehicle and is in a state that execution is possible. Therefore, by turning on the indicator or by turning it on and off, a driver is informed positively whether the recharging power generating control is executed or the recharging power generation control is not executed. As a result, the driver can operate the vehicle differently so that recharging power generation during vehicle slowdown can be executed efficiently.

12 Claims, 2 Drawing Sheets

CONTROL APPARATUS FOR HYBRID VEHICLE

FIELD OF THE INVENTION

This invention relates to a control apparatus for a hybrid vehicle, and particularly to a control apparatus for a hybrid vehicle having an indicator for positively informing a driver of a state of a recharging power generation control during slowdown of the hybrid vehicle.

BACKGROUND OF THE INVENTION

Some motor vehicles are of a type commonly called hybrid vehicles having an internal combustion engine and an electric motor disposed therein as the power sources of a propulsion system. The hybrid vehicle further includes an engine control means for controlling a running state of the engine and motor control means for controlling an operating state of the motor. The engine control means and the motor control means detect respective operating states of the engine and the motor when the vehicle is traveling, and then exchange such detected data regarding the running states. As a result, the respective operating states of the engine and the motor are controlled in association with one another. Such a control system attains a high level of required performance (such as fuel efficiency, lower values of detrimental components in exhaust gases, and improved power performance).

One such example of a control apparatus of a hybrid vehicle is disclosed in published Japanese Application Laid-Open No. 7-315078. The indication unit for a hybrid vehicle of this disclosure, which is arranged on a hybrid vehicle having an electric motor and an internal combustion engine, possesses a throttle opened angle detecting means to detect an opened angle of a throttle valve in the internal combustion engine. A pedal position detecting means detects a position of an accelerator pedal. A throttle indicating section indicates an opened angle of a throttle valve detected by the throttle opened angle detecting means. A position pedal indicating section indicates a position of an accelerator pedal detected by the pedal position detecting means. The indication unit informs a driver of appropriate drive information for a hybrid vehicle.

A monitor screen or indicator equipped with a control apparatus of a traditional hybrid vehicle merely shows a current movement situation of a motor and an engine. As a result, the monitor screen or the indicator in a control apparatus of a traditional hybrid vehicle does not suggest positively "how driver should drive from now on" to a driver, and there is inconvenience in that operation of a hybrid vehicle is not maximized. In particular, the control apparatus does not promote or educate a driver so as to let the important recharged voltage in a hybrid vehicle 100% effectively function.

This invention solves the above-mentioned problem, and provides a control apparatus for a vehicle to definitely communicate to a driver a situation where the recharging power generating control by a control unit of a hybrid vehicle is executed, or is not executed and may be executed as well. The invention can urge a driver to get a maximum recharging power generating effect for recharging a main battery in this situation. And, in slowdown of a hybrid vehicle, it is an opportunity that the recharging power generation can be executed to not completely use fuel.

In order to obviate or minimize the above problem, the present invention provides a control apparatus for a hybrid vehicle having an engine and a motor disposed therein as a vehicle-propelling system. The motor is connected to an output shaft and has both driving and power-generating functions. An engine control means controls a running state of the engine. A motor control means controls both driving and recharging power-generating states of the motor to be independent from the control of the engine by the engine control means. An indicator connected to the motor control means is turned on when the recharging power generating control is executed during slowdown of the hybrid vehicle. The indicator is turned on and off when the recharging power generating control is not executed during slowdown of the hybrid vehicle and the vehicle is in a state that it may be executed.

According to the present invention as previously described, a motor control means controls so as to turn on an indicator when a recharging power generating control is executed during slowdown of the hybrid vehicle, and controls so as to turn the indicator on and off when the recharging power generating control is not executed and is in a state that it may be executed. Therefore, by turning on the indicator or by turning it on and off, a driver is positively informed whether recharging power generating control is executed during slowdown of the hybrid vehicle or not executed even though capable of being executed. As a result, the recharging power generation during the slowdown that is a characteristic of a hybrid vehicle can be executed efficiently.

DETAILED DESCRIPTION

The present invention will now be described in specific detail with reference to FIGS. 1–2 which illustrate an embodiment of this invention.

Figure 2:
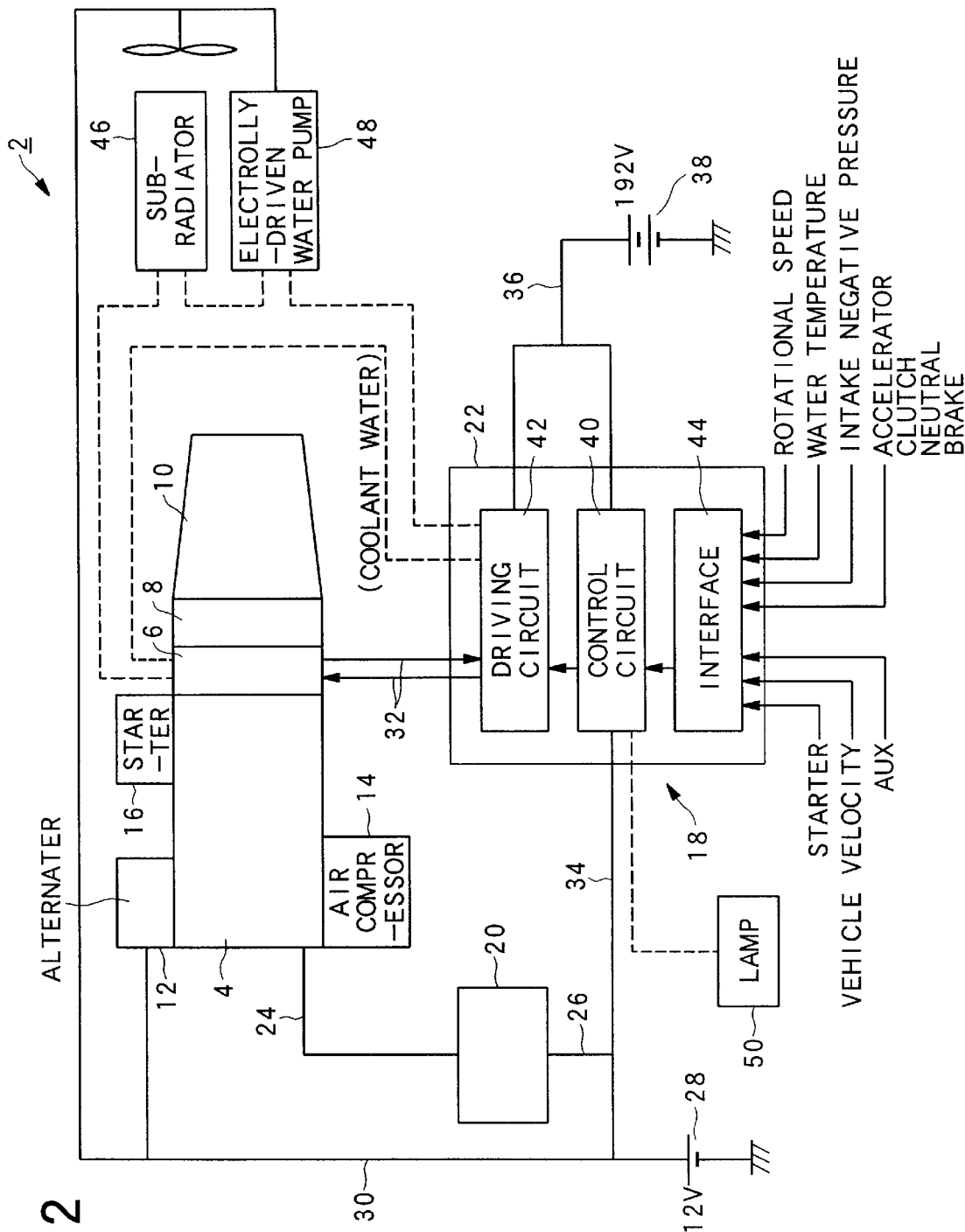
FIG. 2 is a control system diagram for a hybrid vehicle.

In FIG. 2, reference numeral 2 denotes a vehicle-propelling system for a hybrid vehicle of a manual shift type (not illustrated); 4 an engine; 6 a motor; 8 a clutch; and, 10 a manually operated transmission. In the hybrid vehicle, the engine 4 and the motor 6 having both driving and power-generating functions that is connected with an output shaft (not shown) of the engine 4, are disposed therein as the vehicle-propelling system 2.

In the engine 4, for example, the motor 6 is directly connected to the engine 6, and the manual transmission 10 is directly connected to the motor 6 through the clutch 8. Further, the engine 4 is provided with an alternator 12, an air-conditioner (A/C) compressor 14 and a starter motor 16.

Incidentally, the motor 6 is positioned between the engine 4 and the manually operated transmission 10. In addition, the motor 6 includes a stator coil and a rotor such as a flywheel (not illustrated).

The vehicle-propulsion system 2 includes, as a control means 18, an engine control means 20 and a motor control means 22. The engine control means 20 controls a running state of the engine 4, while the motor control means 22 controls both driving and power-generating states of the motor 6.

The engine 4 is connected to the engine control means 20 through an engine-controlling signal line 24. "Line" is used herein to describe an electrical signal conduit. The engine control means 20 is linked to a sub-battery 28 through an engine control means-dedicated power line 26. The sub-battery 28 is coupled to the alternator 12 through a sub-battery-charging power line 30. The sub-battery 28 is a conventional 12-volt vehicle battery.

The motor 6 is connected to the motor control means 22 through a motor-controlling signal line 32. The motor control means 22 is linked to the "sub-battery" 28 through a motor control means-dedicated sub-power line 34 and the power line 30. The motor control means 22 is also coupled to a main battery 38 through a motor control means-dedicated main power line 36. The main battery 38 supplies driving electric power to the motor 6 and is recharged by generated electric power from the motor 6.

The motor control means 22 is connected at the input side in order to receive the following signals: a starter signal; a vehicle velocity signal; an engine rotational speed signal; a water temperature signal; an intake negative pressure signal; an accelerator state signal; a clutch signal; a brake state signal; and a neutral state signal.

The motor control means 22 includes a motor control unit 40 that is a control circuit, a motor drive unit 42 that is a drive circuit and input/output-processing section (interface) 44.

Moreover, a cooling sub-radiator 46 to connect with the motor 6 is provided and is driven under the control of the motor control means 22. In addition, an electric water pump 48 for supplying a cooling water to motor 6 is provided.

The motor control means 22 is linked at the output side to the motor 6.

The control apparatus 18 of the vehicle-propelling system 2 includes both the engine control means 20 and the motor control means 22. The engine control means 20 controls an operating state of the engine 4, while the motor control means 22 controls both driving and reviving or recharging power-generating states of the motor 6. More specifically, the motor control means 22 does not exchange data with the engine control means 20, is independent from the control of the engine 4 by the engine control means 20 and independently determines and controls the drive state and the recharging power generation state of the motor 6 for recharging battery 38.

Moreover, the following function is added to the motor control means 22 by providing an indicator, for example, an indicator lamp 50. When the recharging power generating control is executed during slowdown of the hybrid vehicle, the motor control means 22 controls so as to turn on the indicator lamp 50. When the recharging power generating control is not executed and the vehicle is in a state that it may be executed during slowdown of a hybrid vehicle, then the motor control means 22 controls so as to turn on and off the indicator lamp 50.

Therefore, the motor control means decides during slowdown of a hybrid vehicle whether a recharging power generating control is executed or not executed, while in a state that it may be executed, on the basis of the recharging voltage stop condition consisting of a clutch state signal to detect a clutch-cut-off state and a neutral state signal to detect if the vehicle drive is disengaged with the clutch released.

Specifically, the motor control means 22 determines in sequence whether a hybrid vehicle is in slowdown, whether a vehicle velocity is more than a set value #Ne, whether a clutch is cut off, and whether a clutch is in a neutral state. The motor control means 22 then outputs a control signal to an indicator lamp 50. More specifically, when a recharging power generating control is executed, then an indicator lamp 50 is turned on for indication of an in-execution state of recharging. When the recharging power generating control is not executed and is in a state where it may be executed as well, then an indicator lamp 50 is turned on and off for indication of an execution possibility state of recharging.

Operation of the embodiment will now be described with reference to a control flowchart of an instruction indicator for main battery recharging in FIG. 1 for use in the control apparatus 18.

Figure 1:
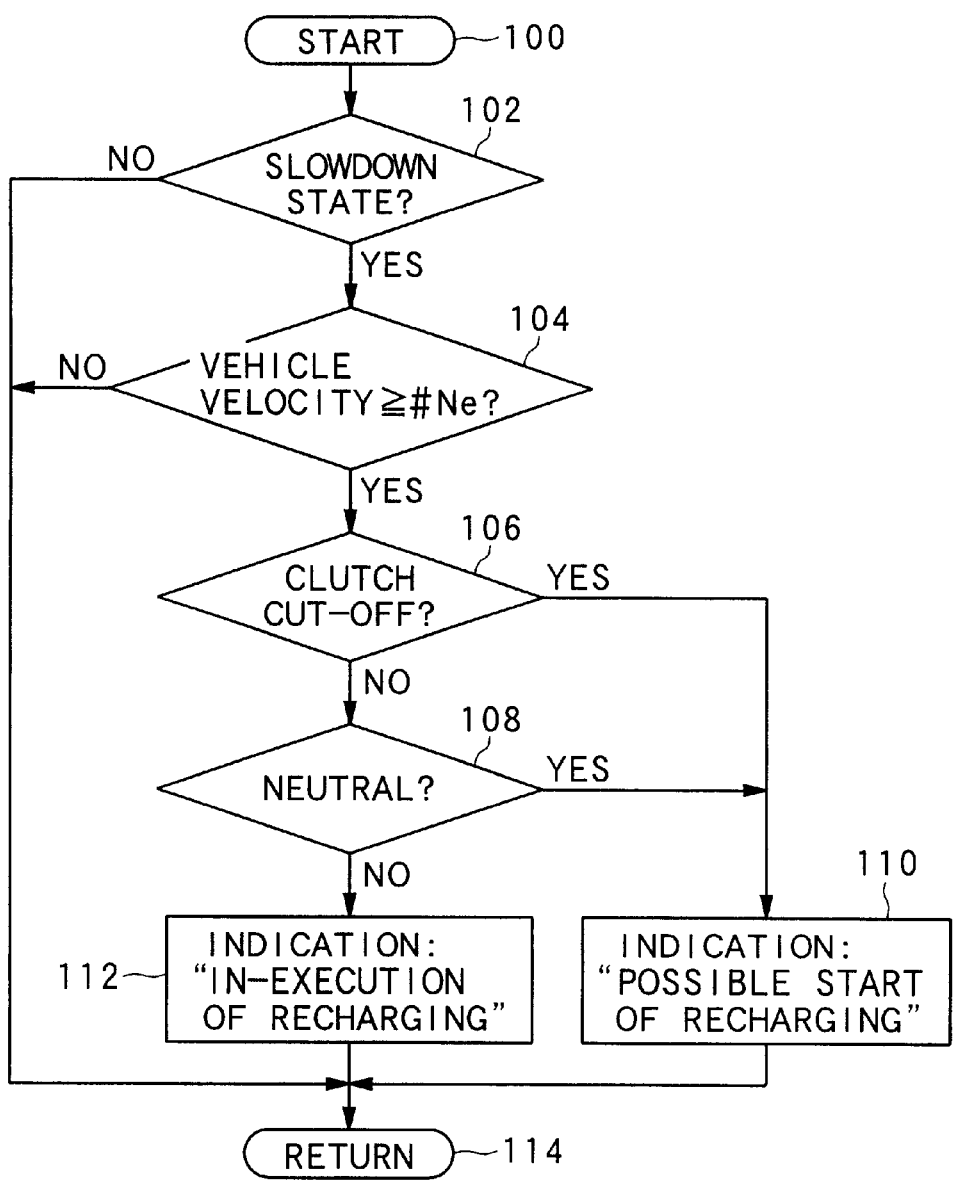
FIG. 1 is a control flowchart of an instruction indicator for battery recharging showing an embodiment of the present invention.

Referring now to FIG. 1, the motor control means 22 starts control at step 100. Then a determination is made at step 102 as to whether the hybrid vehicle is in a slowdown state. When the determination in step 102 results in "NO", then the routine is returned to step 114 mentioned later. When the determination in previous step 102 is "YES", then a determination is made at step 104 as to whether the vehicle velocity is more than a set value #Ne.

When the determination in step 104 results in "NO", then the routine is returned to step 114. When the determination in previous step 104 is "YES", then a determination is made at step 106 as to whether the clutch is in a cut-off-state (disengaged by driver moving the clutch).

When the determination in step 106 is "NO", then a determination is made at step 108 as to whether the clutch is in neutral state (released but no engagement with a gear). When the answer to the determination in step 106 is "YES", then the motor control means 22 outputs the following control signal to the indicator lamp 50. The indicator lamp 50 is turned on and off for indication of the execution possibility state for recharging at step 110, because the recharging power generating control is not executed and the vehicle is in a state that it may be executed by placing the vehicle in gear. Thereafter, the routine is returned to step 114.

Moreover, when the determination made at step 108 is "YES" because the clutch is in a neutral state, then the routine is returned to the execution possibility state to indicate that for recharging is possible at step 110. When the answer to the determination in step 108 is "NO", then the motor control means 22 outputs the following control signal to the indicator lamp 50; an indicator lamp 50 is turned on for indication of an in-execution state of recharging at step 112, because the recharging power generating control is executed. Thereafter, the routine is advanced to step 114 and returned to step 100.

Here, an above-mentioned control flowchart of an instruction indicator for battery recharging is additionally explained as follows. Usually, when a running vehicle has shifted into a slowdown state from a running state, fuel cut control is done in the engine 4. Consequently, the vehicle is slowed down while using an engine brake and a foot brake and is stopped.

In a hybrid vehicle, the motor 6 is used as an electric power generator utilizing energy during slowdown, and a recharging power generation changes main battery 38. But, when the clutch is in neutral-state or in cut-off-state, the motor 6 is not controlled to do the recharging power generation. Specifically, when a hybrid vehicle is in a slowdown state, and does a recharging power generation, indicator lamp 50 turns on in order to display "in-execution of recharging".

In addition, while the vehicle is in the state where a recharging power generation in slowdown can be executed, when a clutch is in a neutral-state or in a cut-off-state, "execution possibility state for recharging", indicator lamp 50 is turned on and off and is displayed to urge a driver to execute a recharging power generation by placing the vehicle in gear or releasing the clutch.

Incidentally, when a slowdown state is nearing the end and has become an impossible state for recharging, the indicator lamp 50 is turned off.

Therefore, by turning on the indicator lamp 50 or by turning it on and off, a driver can be informed positively whether the vehicle state is that the recharging power generating control is executed during slowdown of the hybrid vehicle or the state is that the recharging power generation control is not executed during slowdown of said hybrid vehicle, but execution is possible. As a result, the recharging power generation during the slowdown that is a characteristic of a hybrid vehicle can be executed efficiently. The wasting of electrical energy due to failure to obtain a recharging power generation can be prevented by driver education. The system, if widely used, can let conscientious drivers improve energy collection for the hybrid vehicle.

Moreover, the motor control means 22, by a clutch state signal, detects a clutch cut-off-state and a recharging voltage stopping condition consisting of a clutch state signal, whether the state that the recharging power generating control is executed during slowdown of a hybrid vehicle or is not executed, but is capable of being executed. Thus, this control means, by the clutch state signal detecting clutch-cut-off state and the recharging voltage stopping condition consisting of a clutch neutral state signal, precisely selects if "in-execution of recharging" is indicated by indicator lamp 50 to show that the recharging power generation control is executed. The indicator lamp 50 provides an indication of "execution possibility state of recharging" in that the lamp is turned on and off. Therefore, the control means can improve on reliability of control.

Furthermore, this invention is not limited to the above-mentioned embodiments, but is suitable to many possible innovations and applications.

For example, in some embodiments, though the motor control means is an added control function so as to turn on and off, when the recharging power generating control is not executed and is in a state that it could be executed, the motor control means not only controls an indicator on and off, but it can have a special constitution for doing the recharging power generation positively.

Specifically, during slowdown of a hybrid vehicle, when the recharging power generating control is not executed and the vehicle is in a state that the recharging can be executed, the motor control means controls to turn an indicator on and off. While the control to turn this indicator on and off is continued for an appointed time, the recharging power generating control is automatically executed.

In this way, during slowdown of a hybrid vehicle, when the recharging power generating control is not executed and is capable of execution, the motor control means positively does a recharging power generation. As a result, it is advantageous in practical use that the control means can automatically charge the voltage of the main battery.

Moreover in embodiments of this invention, the control to turn an indicator on for indicating power generating execution and on and off for indicating the possibility of power generating execution are constituted so as to be executed by determination during slowdown of a hybrid vehicle. However, as a special constitution, the control means can make a timing or determination for executing at idling or constant vehicle speed.

The control means can determine a possibility of power generation execution in a number of driving states, and can thus increase a frequency of power generation and the amount of time of recharging power generation.

As amplified in the above-mentioned description, the present invention provides an indicator so that, by turning the indicator on or by turning it on and off, a driver is informed positively whether the recharging power generating control is operating during slowdown of the hybrid vehicle or the recharging power generation control is not operating. As a result, the recharging power generation during the slowdown that is a characteristic of a hybrid vehicle can be executed efficiently. And the energy not wasted by providing a recharging power generation before stopping can be reduced.

The invention claimed is:

1. A control apparatus for a hybrid disposed therein as a vehicle-propelling system, the motor being connected to an output shaft of the engine and having both driving and power-generating functions, comprising:

an engine controller that controls a running state of the engine;

a motor controller that controls both driving and recharging power-generating states of the motor independent from the control of the engine by the engine controller; and an indicator connected to said motor controller, wherein the indicator (1) is turned on when a recharging power generating control is executed during slowdown of said hybrid vehicle, and (2) is turned on and off when a clutch is disengaged or a shift position is in neutral during slowdown of said hybrid vehicle to indicate that the vehicle is capable of a recharging power generating control.

2. The control apparatus for a hybrid vehicle as defined in claim 1, wherein the motor controller decides during slowdown of a hybrid vehicle whether the recharging power generating control is executed or is not executed and whether the motor controller is in a state capable of execution, on the basis of a recharging power generation during regenerative braking.

3. A control apparatus for a hybrid vehicle having an internal combustion engine and a motor disposed therein as a vehicle-propelling system, the motor being connected to an output shaft and having both driving and power-generating functions, comprising:

an engine controller for controlling a running state of the engine;

a motor controller for controlling both driving and recharging power-generating states of the motor; and an indicator connected to said motor controller, wherein said indicator provides a first indication that recharging power-generating control executes during slowdown of the hybrid vehicle and said indicator provides a second indication that recharging power-generating control does not execute during slowdown of the hybrid vehicle.

4. The control apparatus of claim 3, wherein said indicator comprises a lamp.

5. The control apparatus of claim 4, wherein said lamp illuminates to provide the first indication that the recharging powergeneration control executes during slowdown of the hybrid vehicle.

6. The control apparatus of claim 5, wherein said lamp is turned on and off to provide the second indication that the recharging power-generation control is not executing during slowdown of the hybrid vehicle.

7. The control apparatus of claim 4, wherein said lamp is turned on and off to provide the second indication that the recharging power-generation control is not executing during slowdown of the hybrid vehicle.

8. The control apparatus of claim 3, wherein said motor controller operates independently from the control of the engine by the engine controller.

9. The control apparatus of claim 4, wherein said motor controller operates independently from the control of the engine by the engine controller.

10. The control apparatus of claim 5, wherein said motor controller operates independently from the control of the engine by the engine controller.

11. The control apparatus of claim 4, wherein said lamp provides the second indication that recharging power-generation control does not execute during slowdown of the hybrid vehicle when a clutch is disengaged or when the shift position is neutral.

12. A control apparatus for a hybrid vehicle having an internal combustion engine and a motor disposed therein as a vehicle-propelling system, the motor being connected to an output shaft and having both driving and power-generating functions, comprising:

an engine controller for controlling a running state of the engine;

a motor controller for controlling both driving and recharging power-generating states of the motor; and an indicator connected to said motor controller, wherein said indicator provides a first indication that recharging power-generation control executes during slowdown of the hybrid vehicle and said indicator provides a second indication that recharging power-generation control does not execute during slowdown of the hybrid vehicle when a clutch is disengaged or when the shift position is neutral.

* * * * *